United States Patent [19]

Sterling et al.

[11] Patent Number: 4,980,520
[45] Date of Patent: Dec. 25, 1990

[54] TROLLEY-POLE RETRIEVAL METHOD AND APPARATUS

[75] Inventors: Robert T. Stirling, Surrey; Milan Jandera; Eric Fiddis, both of Burnaby; Gary J. Strachan, Port Coquitlam, all of Canada

[73] Assignee: BC Transit, Burnaby, Canada

[21] Appl. No.: 293,297

[22] Filed: Jan. 4, 1989

[51] Int. Cl.⁵ ............................................. B60L 5/14
[52] U.S. Cl. ......................................... 191/85; 191/91
[58] Field of Search ...................... 191/85, 91, 92, 90, 191/93

[56] References Cited

U.S. PATENT DOCUMENTS

| | | | |
|---|---|---|---|
| 641,371 | 1/1900 | Carlile | 191/85 |
| 750,825 | 2/1904 | Davy | 191/92 |
| 1,362,197 | 12/1920 | Spikes | 191/91 |
| 1,380,314 | 5/1921 | Carpenter | 191/85 |
| 1,646,585 | 10/1927 | Hurst | 191/91 |
| 1,858,402 | 5/1932 | Larsson | 191/85 |
| 1,923,314 | 8/1933 | Larsson | 191/91 |
| 2,117,028 | 5/1938 | Larsson | 191/85 |
| 2,117,030 | 5/1938 | Larsson | 191/85 |
| 2,304,762 | 12/1942 | Larsson | 191/90 |
| 2,324,761 | 7/1943 | Budner | 191/85 |
| 3,825,915 | 7/1974 | Dow | 340/649 |
| 4,745,997 | 5/1988 | Takei et al. | 191/87 |

FOREIGN PATENT DOCUMENTS

490855 2/1953 Canada .

Primary Examiner—Robert P. Olszewski
Assistant Examiner—Mark T. Le
Attorney, Agent, or Firm—John Russell Uren

[57] ABSTRACT

A trolley pole retrieval method and apparatus. A sensing circuit senses threshold values of voltage and continuity in the vehicle power supply circuit, the vehicle motion and the distance travelled. The system responds to the sustained simultaneous conditions of low voltage and open circuit in the power supply circuit while the vehicle is in motion by enabling a distance counter. If the vehicle remains in motion under conditions of low voltage and low continuity for a predetermined distance, trolley pole dewirement is assumed and a retrieval pulley is actuated to return the trolley pole to the vehicle. This prevents damage to overhead power lines.

7 Claims, 9 Drawing Sheets

TROLLEY-POLE RETRIEVAL METHOD AND APPARATUS

INTRODUCTION

This invention relates to a trolly pole retrieval method and apparatus and, more particularly, to a method for sensing whether a dewirement has occurred in a trolley bus and to an apparatus for retrieving the trolley pole if such a dewirement has occurred.

BACKGROUND OF THE INVENTION

Throughout the world, trolley buses are used for public and private transportation. Such buses utilize trolley poles which extend upwardly from the vehicle and contact a power transmission line which carries the power through the trolley pole to the vehicle where the power is provided to an electric motor used to move the vehicle. The power transmission lines which are constructed such that they may be contacted by the trolley are expensive to construct and particularly to maintain. A break or discontinuity in the line can cause a lack of power to all vehicles on that line which are electrically driven and repairs to damaged lines are costly and time consuming.

It is frequently the case that the trolley poles may become separated from the power transmission line or lines while the trolley vehicle is under movement. One way such a separation can occur is if the vehicle is being driven too quickly. Another way such a separation can occur is if there are faults or discontinuities in the overhead lines or if impacts to which the vehicles are subjected as by holes in a road, for example, are transmitted from the vehicle to the trolley poles.

When the trolley pole leaves the power transmission line, a cable connected between a retrieval pulley and the trolley pole is generally activated by the acceleration of the retrieval pulley and acts to pull the trolley pole downwardly such that it will not strike the power transmissions line after dewirement. Striking the power transmission line with a trolley pole after separation can cause serious damage to the lines and to the trolley poles.

The trolley pole retrieval is performed through a retrieval pulley which contains an inertia operated dog and a strong spring connected to the pulley. When the trolley pole dewires, it travels upwardly, a distance which activates the retrieval pulley by the inertia of the dog within in the pulley. The pulley then quickly pulls the cable and trolley pole downwardly and out of possible contact with the power lines.

Present pulleys, however, do not always work properly. The acceleration device may not be activated because the acceleration of the trolley pole in the vertical direction may not be great enough to timely activate the dog. If the dog is not timely activated, the trolley pole may travel upwardly a distance sufficient to strike the power lines which may then cause damage to the power lines.

SUMMARY OF THE INVENTION

According to one aspect of the invention, there is disclosed a trolley pole retrieval method comprising sensing the motion of a vehicle and a low voltage condition in the power supplied to a trolley pole of said vehicle, determining the distance over which said low voltage condition has been present and retrieving said trolley pole if said distance exceeds a predetermined amount.

According to a further aspect of the invention, there is disclosed trolley pole retrieving apparatus comprising a trolley pole connected to a vehicle, low voltage continuity motion and distance sensing means connected to said vehicle and trolley pole retrieval means connected to said trolley pole.

According to a further aspect of the invention, there is disclosed a trolley pole retrieval means comprising a pulley, a cable connected to said pulley, spring means connected to said pulley for winding said cable on said pulley, dog and tooth means connected to said pulley and a dog activator, said dog means being activated to mesh with said tooth means by said dog activator.

According to a further aspect of the invention, there is disclosed a trolley pole retrieval means comprising a pulley, a cable connected to said pulley, motor means operably connected to said pulley for winding said cable on said pulley and activating means to initiate operation of said motor means.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
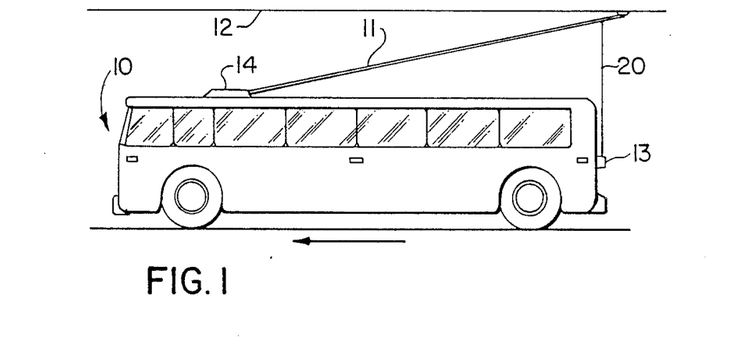
FIG. 1 is a side diagrammatic view illustrating a trolley bus having a trolley pole in contact with a power line according to the invention.

Reference is now made to the drawings in which a vehicle in the form of a trolley bus is illustrated generally at 10 in FIG. 1. A pair of trolley poles 11 are mounted on the roof of the trolley bus 10 and extend to an overhead power line 12. The trolley poles 11 are spring loaded in the mounting area 14 to maintain each of the trolley poles 11 (only one of which is shown) on each of the power lines 12 (only one of which is similarly shown).

A cable in the form of a rope 20 extends from the rearward area of each of the trolley poles 11 to a cable retrieval pulley 13. The cable retrieval pulley 13 acts to wind the cable 20 and thereby keep the cable taut between the pulley 13 and the trolley poles 11 in a manner explained in more detail hereinafter.

Figure 5:
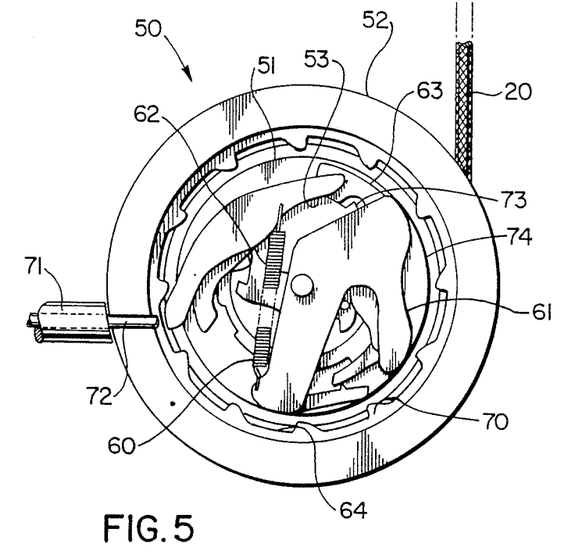
FIG. 5 is a diagrammatic front view of a first embodiment of the retrieval pulley according to the invention.

The cable retrieval pulley 13 is illustrated generally at 50 in FIG. 5. It comprises an inner plate 51 which rotates within cable housing 52. A first dog 53 is pivotally attached to plate 51 at a pin axis. A spring 60 is connected between one end of first dog 53 and an inertia plate 61. A second dog 62 is pivotally connected to the same inertia plate 61. It rotates in a groove 64 machined in the teeth 70 of the cable housing 52, which teeth are rigidly connected to the cable housing 52.

An actuator 71 has a piston 72 movable in and out of the groove 64. It is adapted to contact dog 62 when extended and not to contact dog 62 when retracted.

Second inertia plate 63 meshes with a second set of teeth 73. Teeth 73 are connected to inner pulley 74 on which the cable 20 is wound.

Figure 2:
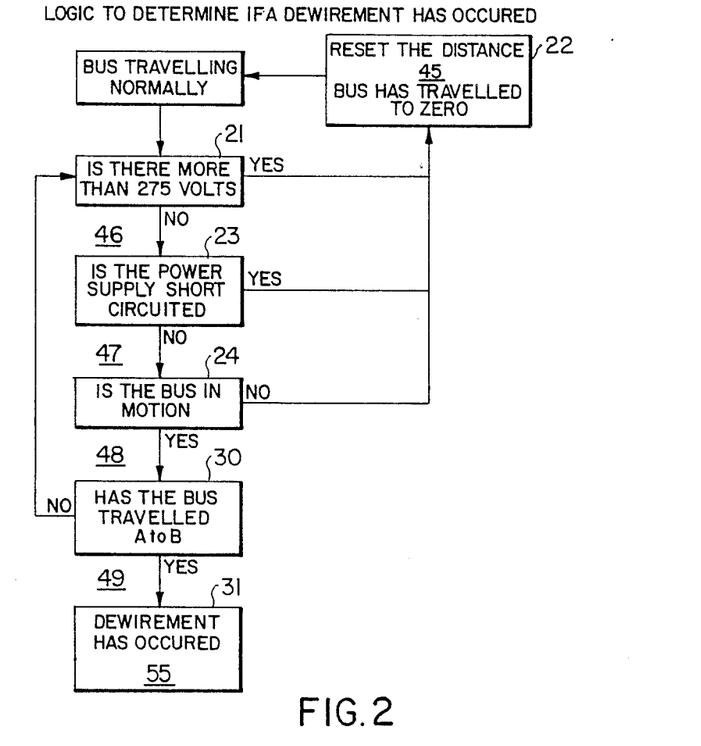
FIG. 2 is a view illustrating the algorithm used when a trolley dewirement occurs according to the invention.
Figure 3A:
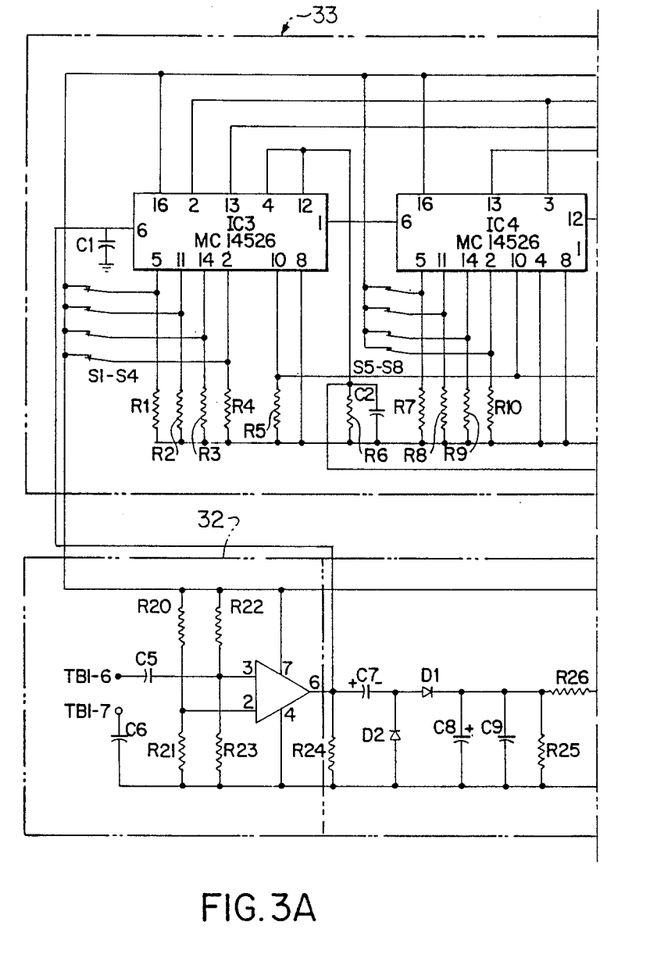
FIGS. 3A-3D is a schematic diagram of the circuit used to fulfill certain of the functions of the algorithm of FIG. 2.
Figure 3B:
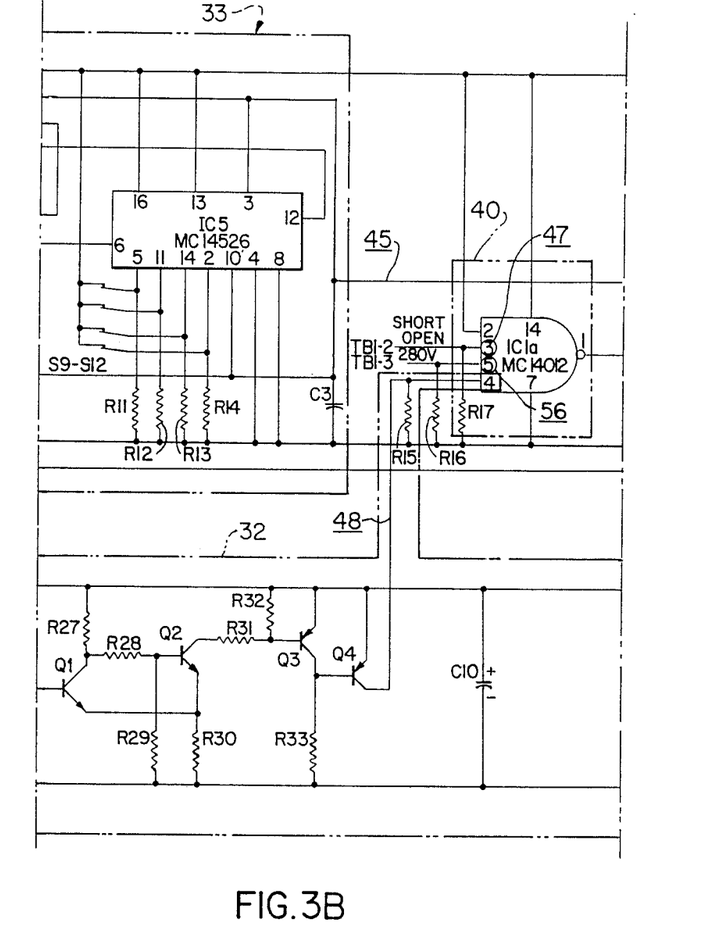
Figure 3C:
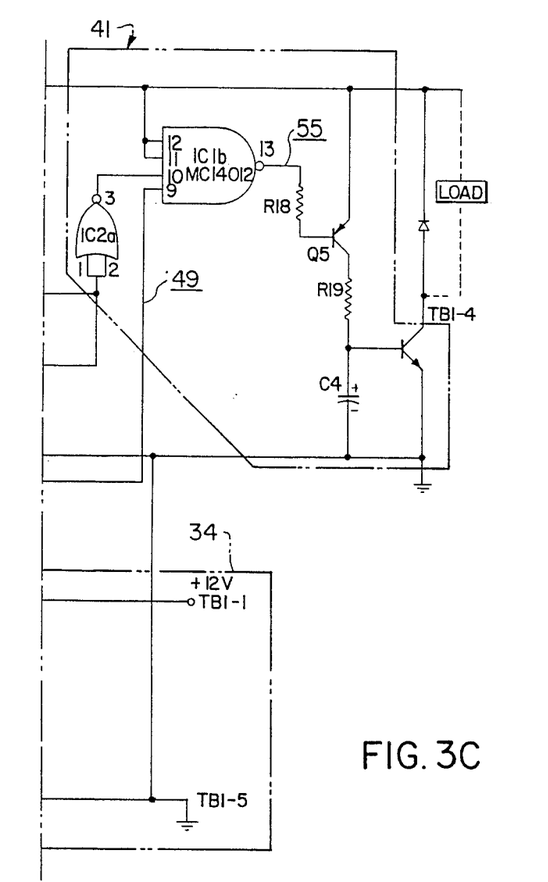
Figure 3D:
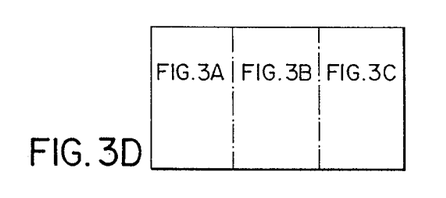
Figure 4A:
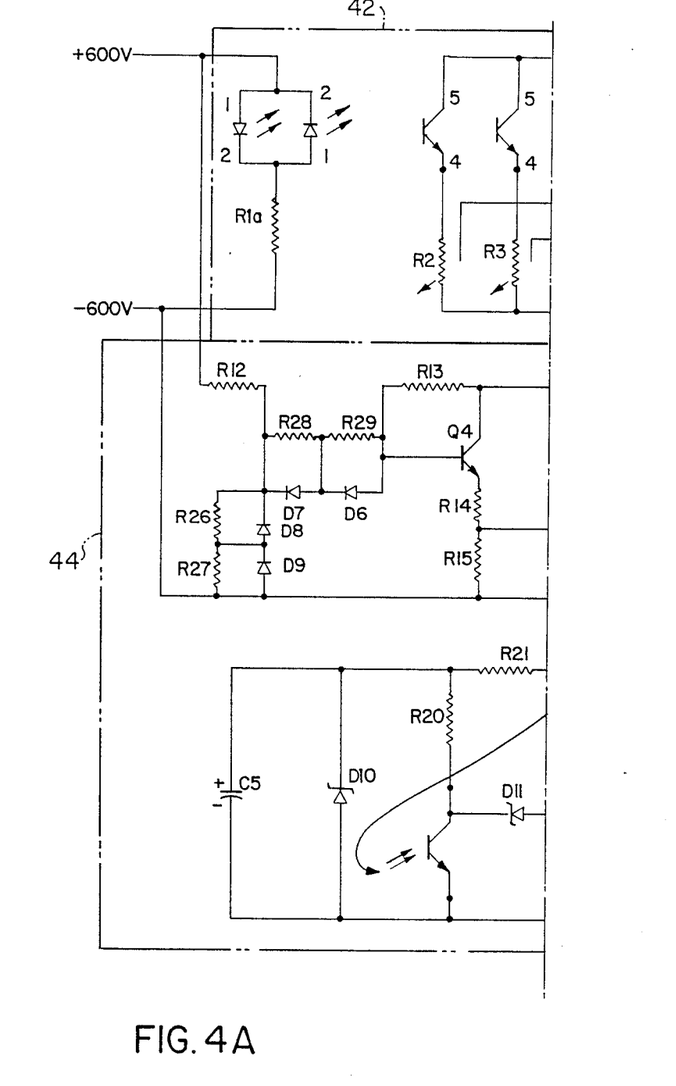
FIGS. 4A-4D is a schematic diagram of the circuit used to fulfill certain of the remaining functions of the algorithm of FIG. 2.
Figure 4B:
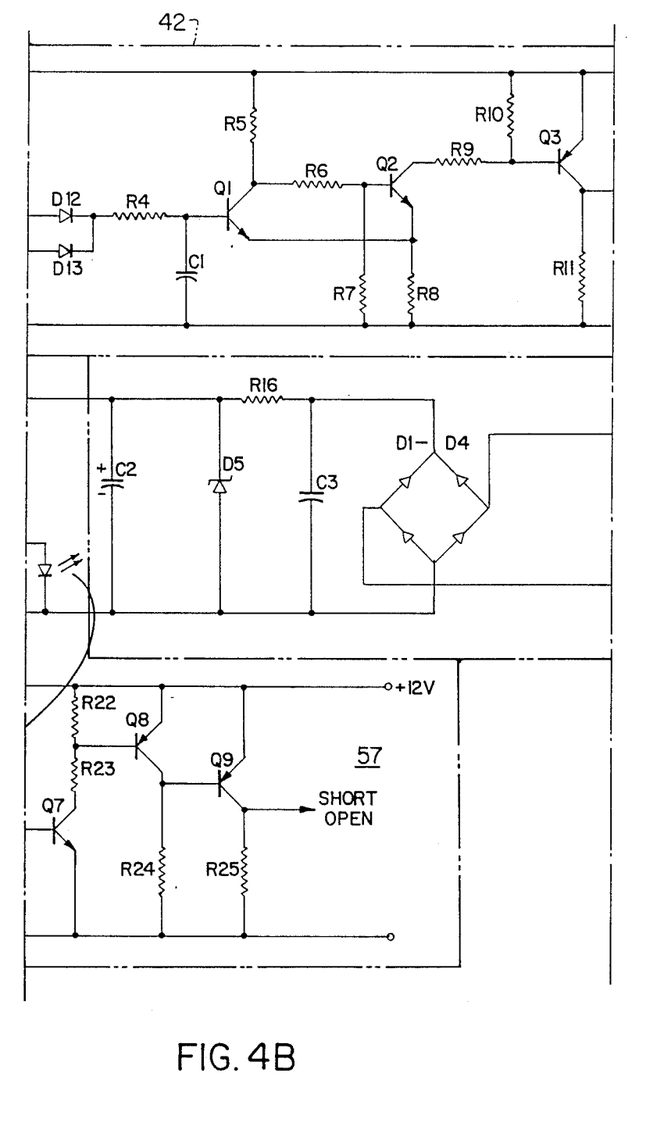
Figure 4C:
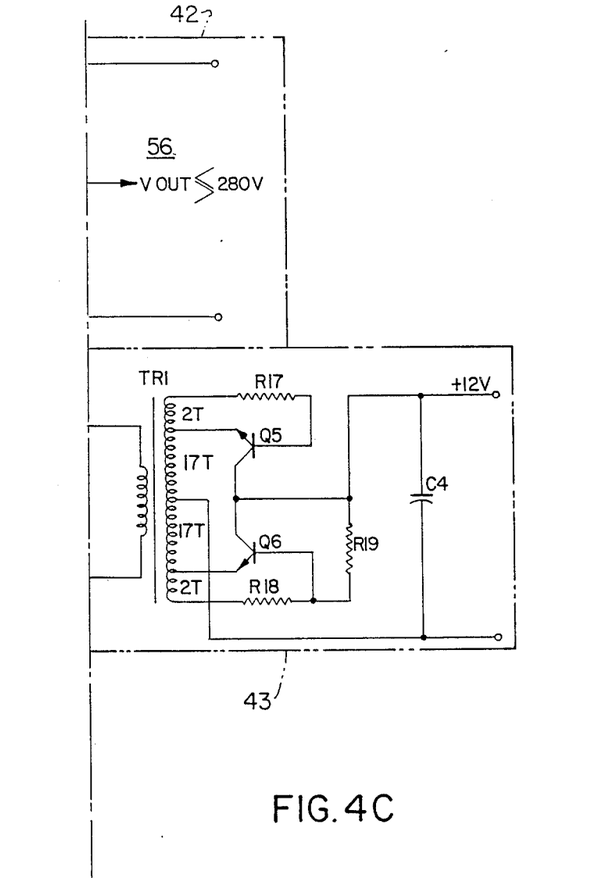
Figure 4D:
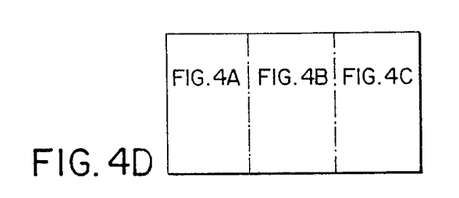

The logic diagram of FIG. 2 comprises four interrogation or decision steps and two command steps. The four interrogation steps are the voltage level determination 21, the determination of the presence of either short or open circuit 23, the determination whether the vehicle 10 is in motion at 24 and the determination whether the bus has travelled a predetermined distance at 30.

The command steps include the distance reset 22 and the dewirement command determination 31.

The flow areas 45, 46, 47, 48, 49 and 55 correspond to circuit conditions at areas identically numbered in the schematic diagrams of FIGS. 3A-3D and 4A-4D.

The voltage quantity required to confirm normal vehicle operation in the voltage quantity determination step 21 is 275 volts. That is, if more than 275 volts are present, normal operation will be assumed. The distance quantity required in the distance determination step 30 is 6.0 feet. That is, if the bus has travelled 6.0 feet with voltage less than 275 volts and there is a closed circuit and the bus 10 is in motion, it will be assumed that a dewirement has occurred.

The schematic diagrams of FIGS. 3A-3D and 4A-4D will now be explained. FIGS. 3A-3D can be divided into five (5) functional subsections, namely an operational amplifier section 32, a counter section 33, a motion detector section 34 and two monitor sections 40, 41.

The operations amplifier and waveshaping section 32 comprises an operational amplifier (OPAMP) IC6 which receives input on TB1-6 and TB1-7 terminals. The input is provided from an electronic speed sensing unit (not illustrated) connected to the vehicle 10. The pulses from the speed sensing unit are amplified and converted into square wave form by OPAMP IC6 and fed to the motion detector section 34 and counter section 33.

Counter section 33 is used to determine the distance travelled by the trolley 10 under "dewired" conditions and counts the number of pulses received from the speed sensing unit 34. It includes three cascaded programmable down counters IC3, IC4, IC5 which count down to zero from an initial value preset by switches S1-S12. The circuit remains in a reset mode (i.e., no counting will occur) until it is enabled by an active low signal from monitor section 40. Upon section 33 being enabled, it will count down to zero and then provide a high signal which enables monitor section 41.

Motion detector section 34 integrates the speed sensor signal and is used to detect motion of the trolley 10. The output from this section is high when the trolley 10 is moving and this high signal is fed to monitor section 40.

Monitor section 40 detects when the power supply is in open circuit condition and the voltage is less than 280 volts and when the trolley bus 10 is in motion. Only when all of these conditions are true will the output of IC1a go low. The low signal enables the counter circuit section 33 to begin counting down.

Monitor section 41 monitors the status of the power supply, the voltage and the motion of the trolley and waits for the counter to reach zero. If any one of the three conditions changes, the entire circuit resets. If the counter reaches zero and the three monitored conditions are still true, the output of IC1b will go low which turns on the transistor switch Q5, Q6. This will supply power to the load which is the cable retrieval pulley for the trolley poles 11.

The schematic according to FIGS. 4A-4D comprises three major sections, namely voltage detector circuit 42, power supply circuit 43 and continuity detector circuit 44.

The voltage detector circuit 42 outputs a high logic level at Vout when the voltage difference between the 600 volt trolley pole and the −600 volt trolley pole drops below the threshold value of 280 volts. The detector circuit 42 utilizes a pair of onto isolators IC1, IC2 to separate the high voltage and low voltage sections. The transistors Q1, Q2, Q3 operate as a switch between the output Vout and the +12 volt supply. When the high voltage difference between the trolley poles drops below 280 volts, the transistor Q3 is turned on and Vout is raised to approximately 12 volts. The threshold value is adjustable by R2 and R3.

Power supply circuit 43 comprises a D.C. to A.C. converter Q5, Q6 which is transformer coupled to a rectifier bridge D1-D4 forming an A.C. to D.C. converter. The voltage is regulated at 15 volts by the zener diode D5 and used to power part of section 44.

The continuity detection circuit 44 measures the continuity between the +600 volt and −600 volt trolley poles. Thus, if the poles leave the wire, there will be no continuity. This is necessary to inhibit the trolley pulldown mechanism when the trolley is on a dead line. This section 44 also uses an optoisolator IC3 and transistor switches Q7, Q8, Q9 to produce a high output signal at the "short open" terminal when the power supply is in an open circuit condition.

OPERATION

With reference to FIG. 5 and in normal and prior operation, the cable 20 extends from the cable housing 52 and the inner plate 51 would rotate counterclockwise as viewed in FIG. 5. The second dog 62 would not be connected to the second inertia plate 63 as in the prior art. Accordingly, as the cable 20 is pulled from the cable housing 52 by the action of the spring mounted trolley poles 11 moving upwardly after dewirement, the inertia of the dog 53 will force it outwardly into contact with teeth 70 in cable housing 52. As soon as contact is made, second inertia plate 63 is pressed outwardly thus releasing the inner pulley 74 from teeth 73. Inner pulley 74 is spring loaded and immediately pulls the trolley poles 11 downwardly and away from the power lines 12 where damage can occur.

In accordance with the present invention, however, as soon as power from the power lines 12 terminates, the voltage interrogation step 21 continuously determines whether more than 275 volts are present and, subsequently, interrogates to determine whether there is electrical continuity present at step 23 or whether the bus is in motion at step 24. Assuming these are interrogated affirmatively, the question will be asked as to whether the distance travelled by the possibly dewired trolley bus 10 is greater than six feet. If so, a dewirement is considered to have occurred at step 31. If such a dewirement is assumed, power will immediately be applied to the actuator 71 which will extend the piston 72 into the groove 64. The second dog 62 will impact against the piston 72 which will force the second inertia plate 63 out of contact with the teeth 73 thereby releasing the spring mounted pulley 74 which will retract the trolley poles 11 towards the pulley 13 and prevent damage to the power lines 12.

Figure 6:
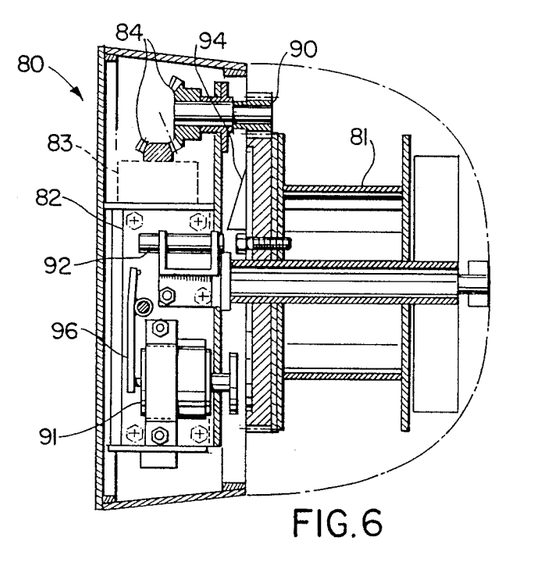
FIG. 6 is a diagrammatic side view of a second embodiment of the retrieval pulley according to the invention.

Yet a further embodiment of the retrieval pulley according to the invention is illustrated in FIG. 6. In this embodiment, the actuator 71 and the second dog 62 of FIG. 5 are not present. Rather, the retrieval pulley 80 comprises a pulldown drum 81 to which the cables 20 running to the trolley poles 11 are connected, one to each pull down drum 81. A starter motor 82 is mounted within the retrieval pulley 80 and is connected to a clutch pack 83. Clutch pack 83 is operably connected to pinion and ring gears 84, 90, respectively. Ring gear 84 is connected directly to the pull down drum 81. A solenoid 91 is positioned in the lower portion of the housing of the retrieval pulley 80 and a lever 96 extends from solenoid 91 to longitudinally movable pin 92. A catch plate 94 is rigidly mounted on the side of pull down drum 81 and rotates therewith. This embodiment is used to positively pull down the trolley poles 11 such that no delay is present as is the case with the cable retrieval pulley embodiment of FIG. 5.

In operation, when a dewired condition is sensed in the logic circuit of FIG. 2, power is immediately provided to the starter motor 82 which turns gears 84, 90 through clutch pack 83 and pulls down cable 20 connected to the trolley pole 11 which is off the power line 12. When the trolley pole 11 is in the fully down position, the solenoid 91 is energized. This forces pin 92 outwardly toward pull down drum 81 where it engages with catch plate 94 on the pull down drum 81. The drum 81 will, therefore, be held in locked position which holds the trolley pole 11 down until the solenoid 91 is deenergized such that the trolley pole 11 can be reconnected to the overhead power line 12.

Many further changes to the apparatus and method described will readily occur to those skilled in the art to which the invention relates and the specific embodiments described should be taken as illustrative of the invention only and not as limiting its scope as construed in accordance with the accompanying claims.

I claim:

1. A method for retrieving a dewired trolley pole of a vehicle comprising the steps of:
    (a) determining whether said vehicle is in motion;
    (b) determining whether a low voltage condition exists in power supplied to said trolley pole;
    (c) determining the distance said vehicle has travelled over which said low voltage condition has existed; and
    (d) retrieving said trolley pole if said distance over which said vehicle has travelled exceeds a predetermined amount.

2. A method for retrieving a dewired trolley pole of a vehicle according to claim 1 and further comprising the step of determining whether said low voltage condition is due to an open circuit.

3. A method for retrieving the dewired trolley pole of a vehicle comprising the steps of:
    (a) sensing motion of said vehicle;
    (b) determining whether a low voltage condition exists in power supplied to said trolley pole of said vehicle;
    (c) determining whether said vehicle is moving;
    (d) determining the distance said vehicle has travelled over which said low voltage condition has existed; and
    (e) retrieving said trolley pole if said distance is greater than a predetermined amount.

4. A method for retrieving a dewired trolley pole of a vehicle according to claim 3 and further comprising the step of determining whether said low voltage condition to said trolley pole is caused by an open circuit.

5. Apparatus for retrieving a dewired trolley pole of a vehicle comprising a low voltage sensing device for determining voltage of said trolley pole, a motion sensing device for sensing motion of said vehicle, a distance sensing device connected to said low voltage sensing device and to determine said motion sensing device the distance travelled by said vehicle under conditions of low voltage and a trolley pole retrieval device connected between said vehicle and said trolley pole.

6. Apparatus as in claim 5 and further comprising a circuit sensing device for determining whether an electrical circuit connected to said trolley pole is continuous.

7. Apparatus as in claim 6 wherein said trolley retrieval device comprises a motor operated pulley and an attachment connected between said trolley pole and said pulley.

* * * * *

UNITED STATES PATENT AND TRADEMARK OFFICE
CERTIFICATE OF CORRECTION

PATENT NO. : 4,980,520

DATED : DECEMBER 25, 1990

INVENTOR(S) : Robert T. Stirling

It is certified that error appears in the above-identified patent and that said Letters Patent is hereby corrected as shown below:

On the title page item [19] replace "Sterling et al." with
--Stirling et al.--.

In Column 6, line 35 should read: device and said motion sensing device to determine the Signed and Sealed this Twenty-first Day of April, 1992

Attest:

HARRY F. MANBECK, JR.

*Attesting Officer*  *Commissioner of Patents and Trademarks*